United States Patent
Phillips et al.

(10) Patent No.: US 8,220,663 B2
(45) Date of Patent: Jul. 17, 2012

(54) MULTIPLE INLET TUBE DISPENSING SYSTEM

(75) Inventors: David L. Phillips, Santa Ana, CA (US); Gerard Caldwell, Corona, CA (US); Nikhil Jitendra Gandhi, Anaheim, CA (US)

(73) Assignee: Xylem IP Holdings LLC, White Plains, NY (US)

( * ) Notice: Subject to any disclaimer, the term of this patent is extended or adjusted under 35 U.S.C. 154(b) by 847 days.

(21) Appl. No.: 12/251,160

(22) Filed: Oct. 14, 2008

(65) Prior Publication Data

US 2009/0095768 A1    Apr. 16, 2009

Related U.S. Application Data

(60) Provisional application No. 60/998,857, filed on Oct. 12, 2007.

(51) Int. Cl.
   *B67D 7/70* (2010.01)
(52) U.S. Cl. .......... 222/136; 222/1; 222/130; 222/204; 137/571
(58) Field of Classification Search ............ 222/1.129, 222/129.1, 130, 132, 136, 251, 204, 325; 137/571
   See application file for complete search history.

(56) References Cited

U.S. PATENT DOCUMENTS

| | | | | |
|---|---|---|---|---|
| 3,653,413 A | * | 4/1972 | Sheya | ............................. 141/1 |
| 3,747,643 A | | 7/1973 | Freeman | |
| 3,845,787 A | * | 11/1974 | Slagle | ........................... 137/571 |
| 3,863,664 A | * | 2/1975 | Holbrook et al. | ............ 137/205 |
| 4,112,538 A | | 9/1978 | Bates | |
| 4,793,246 A | | 12/1988 | Barradas | |
| 4,838,307 A | * | 6/1989 | Sasaki et al. | .................. 137/574 |
| 4,888,980 A | | 12/1989 | DeRome | |
| 4,892,031 A | | 1/1990 | Webster et al. | |
| 4,938,396 A | * | 7/1990 | Shannon | ....................... 222/641 |
| 5,272,960 A | | 12/1993 | Kinna | |
| 5,858,437 A | | 1/1999 | Anson | |
| 6,347,645 B2 | | 2/2002 | Gurubatham et al. | |
| 7,007,826 B2 | * | 3/2006 | Shapanus et al. | ............. 222/175 |
| 8,123,076 B2 | * | 2/2012 | Phillips et al. | .................. 222/66 |
| 2004/0159536 A1 | | 8/2004 | Kamen et al. | |
| 2004/0258535 A1 | | 12/2004 | Tash | |

FOREIGN PATENT DOCUMENTS

EP    0472272    2/1992

OTHER PUBLICATIONS

PCT/US08/79847 International Search Report, mailed Dec. 12, 2008.
Extended European Search Report issued on Aug. 26, 2011 in counterpart EP application No. 08837301.4 (3 pages).

* cited by examiner

*Primary Examiner* — Frederick C. Nicolas

(57) ABSTRACT

The present invention provides a system featuring a dispenser for providing fluid from multiple reservoirs to an appliance or other suitable device; and a multiple tubing arrangement coupled between the dispenser and the multiple reservoirs of fluid, the multiple tubing arrangement being responsive to a vacuum provided from the dispenser, for drawing the fluid from the multiple reservoirs so as to deplete the multiple reservoirs at relatively equal amounts based on the Venturi effect. The multiple tubing arrangement comprises a primary inlet tube for arranging in a primary reservoir, an auxiliary inlet tube for arranging in an auxiliary reservoir, and a feed connector tube arranged between the primary inlet tube and auxiliary inlet tube. The primary inlet tube is coupled to the auxiliary inlet tube so as to provide a proportional vacuum and siphoning effect. The multiple tubing arrangement siphons and depletes the fluid from the primary reservoir and the auxiliary reservoir based on the Venturi effect.

21 Claims, 2 Drawing Sheets

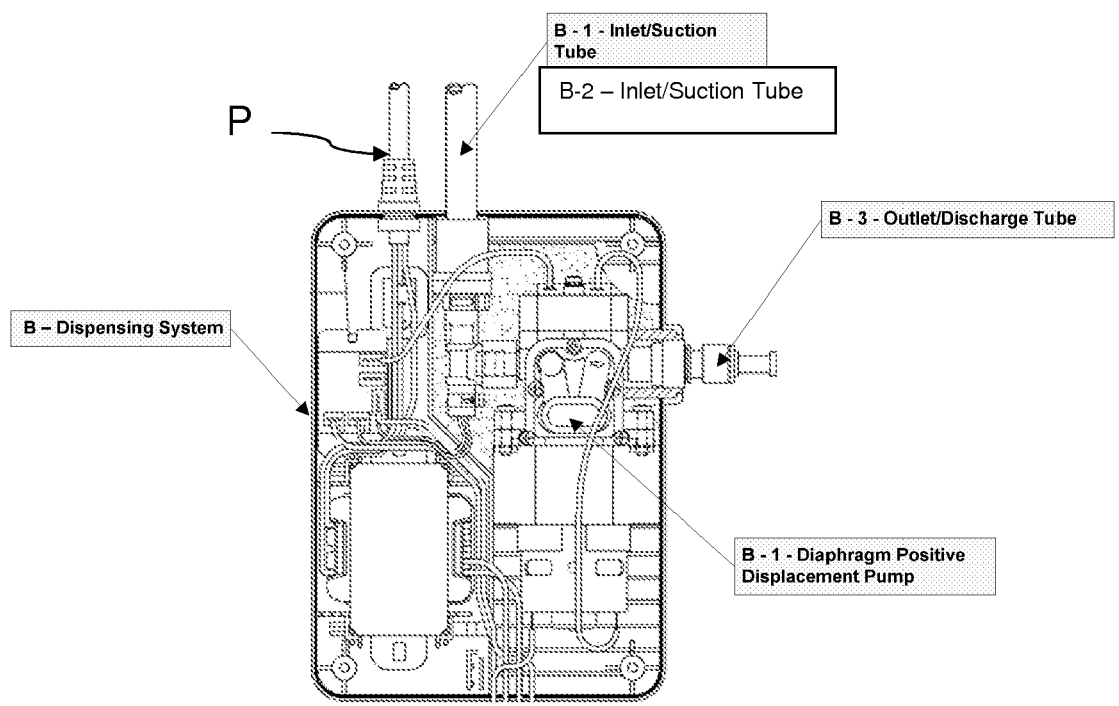
Figure 3
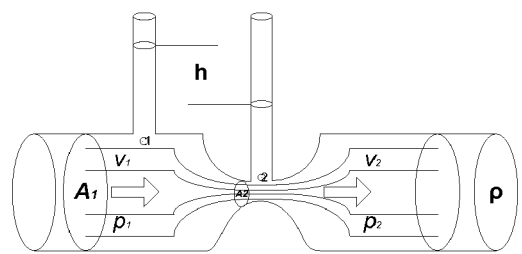
Venturi Device Principle of Operation
Figure 4A
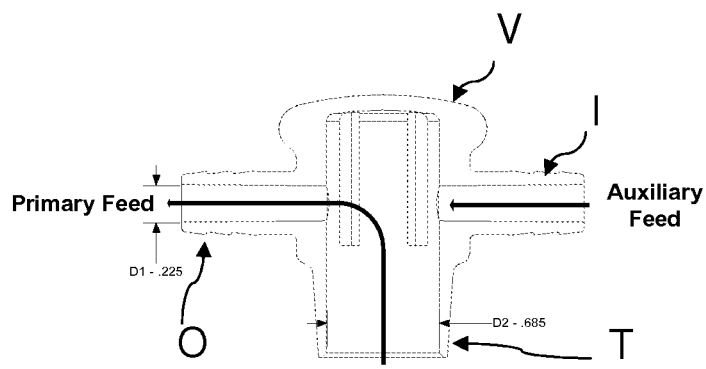
Venturi Device for Multiple Inlet Tube
Dispensing System
Figure 4B
Figure 4

MULTIPLE INLET TUBE DISPENSING SYSTEM

CROSS REFERENCE TO RELATED APPLICATIONS

This application claims benefit to provisional patent application No. 60/998,857, filed 12 Oct. 2007, which is hereby incorporated be reference in its entirety.

BACKGROUND OF THE INVENTION

1. Field of the Invention

The present invention relates to a method and apparatus for dispensing a fluid; and more particularly relates to a dispensing system having a multiple tube inlet.

2. Brief Description of Related Art

There are many dispensing systems on the market and known in the art, some of which include the following:

U.S. Pat. No. 5,272,960 discloses a dispensing machine having an electromechanical delivery of fluid from a reservoir to an infusion-type beverage arranged in a sachet with valves and solenoids based on a technique that increases the pressure within an initially sealed package so as to rupture and release beverage material therein by applying heat to the seal the package to minimize ruptures.

U.S. Pat. No. 5,858,437 discloses a method of brewing reduced temperature coffee also having an electromechanical delivery of fluid from two reservoir at different temperatures (e.g. 100° and 200°) with valves and controllers to a brew funnel containing coffee based on a technique that dispenses a predetermined quantity of temperature reduction water from one of the reservoirs.

U.S. Pat. No. 4,892,031 discloses a modularized custom beverage brewer using a technique based on the control of a cantilevered portion and control means for delivering fluid to a spray head that provides the fluid to beverage grounds for dripping a brewed beverage.

U.S. Pat. No. 4,793,246 discloses an electrically operated hot beverage maker using a technique based on a flexible, expandable water container that fills with water and expands laterally to accommodate more water than when the container is in the relaxed position.

Moreover, there are other known dispensing systems; however, none of these known dispensing systems have multiple inlet sources.

Some problems with the known dispensing systems include one or more of the following:
- Allow for only one inlet source, requiring manual change over
- Requires excessive manual change overs, which is undesirable during peak business hours
- Collapses the bottle due to drawing vacuum and not shutting off.
- Contamination to the fluid system.
- Some units require flooded inlet.

In effect, none of the aforementioned systems or techniques pertain to Venturi-based fluid dispensing, especially from dispensers having multi-inlet tubing.

SUMMARY OF THE INVENTION

The present invention provides a new and unique method and apparatus for dispensing fluid from multiple reservoirs.

The apparatus features a system having a dispenser configured to provide fluid from multiple reservoirs to an appliance or other suitable device; and a multiple tubing arrangement configured to couple the dispenser and the multiple reservoirs of fluid, the multiple tubing arrangement being responsive to a vacuum provided from the dispenser, for drawing the fluid from the multiple reservoirs so as to deplete the multiple reservoirs at relatively equal amounts based on the Venturi effect.

The multiple tubing arrangement comprises some combination of a primary inlet tube configured for arranging in a primary reservoir, an auxiliary inlet tube configured for arranging in an auxiliary reservoir, a feed connector tube configured for arranging between the primary inlet tube and auxiliary inlet tube, an inlet suction tube configured for arranging between the dispenser and the primary inlet tube, or a discharge tube configured for arranging between the dispenser and the appliance.

The primary inlet tube may include a Venturi device having inlet and outlet ports for respectively receiving an auxiliary feed and providing a primary feed, as well as tubing for inserting into the primary reservoir, and may be configured to couple to the auxiliary inlet tube so as to provide a proportional vacuum and siphoning effect.

The auxiliary inlet tube may also include a device having an outlet port for providing the auxiliary feed, as well as tubing for inserting into the auxiliary reservoir. Embodiments are envisioned using multiple auxiliary reservoirs that are daisy chained together, where one or more of the auxiliary inlet tubes may also include an associate Venturi device having inlet and outlet ports for respectively receiving an auxiliary feed from another auxiliary reservoir and providing an associate primary feed, as well as associated tubing for inserting into its associated auxiliary reservoir. In such embodiments, an end auxiliary inlet tube would typically include an associated device having an associated outlet port for providing an associated auxiliary feed to a next auxiliary inlet tube, as well as associated tubing for inserting into its associated auxiliary reservoir.

The dispenser may include a diaphragm positive displacement pump that draws fluid from the primary reservoir via the primary inlet tubing.

In operation, the multiple tubing arrangement is configured to siphon and deplete the fluid from the primary reservoir and the auxiliary reservoir based on the Venturi effect. For example, the primary inlet tube may include a Venturi device arranged therein for creating a suction. The Venturi device may include a short tube with a tapering constriction in the middle that causes an increase in velocity of flow of the fluid and a corresponding decrease in fluid pressure.

The system also features a discharge tube configured to couple the dispenser and the appliance.

The multiple reservoirs may be open to atmospheric pressure, and does not require container vacuum to create the proportional vacuum and siphoning effect.

The number of auxiliary inlet tubes and reservoirs depends on the amount of vacuum generated by the dispenser.

The present invention may also take the form of a method featuring coupling a multiple tubing arrangement between a dispenser and multiple reservoirs of fluid; and activating the dispenser for generating a vacuum in the multiple tube arrangement so as to draw the fluid from the multiple reservoirs, deplete the multiple reservoirs at relatively equal amounts based on the Venturi effect, and provide the fluid from the dispenser for provisioning to an appliance.

The present invention may also take the form of a kit featuring a dispenser for providing fluid from multiple reservoirs to an appliance or other suitable device; and a multiple tubing arrangement configured for coupling between the dispenser and the multiple reservoirs of fluid, the multiple tubing arrangement also being configured for responding to a vacuum provided from the dispenser, for drawing the fluid from the multiple reservoirs so as to deplete the multiple reservoirs at relatively equal amounts based on the Venturi effect. In this embodiment, the multiple tubing arrangement may include some combination of a primary inlet tube configured for arranging in a primary reservoir, an auxiliary inlet tube configured for arranging in an auxiliary reservoir, a feed connector tube configured for arranging between the primary inlet tube and auxiliary inlet tube, an inlet suction tube configured for arranging between the dispenser and the primary inlet tube, or a discharge tube configured for arranging between the dispenser and the appliance.

Some advantages of the present invention include:
Allows for multiple inlet sources;
Providing multiple inlet sources limits time between change over;
Provides a continuous vacuum loop between the tubes;
Eliminates the cross contamination due to the continuous loop; and
Equal size tubes allows for equal distribution of water to level the reservoirs.

BRIEF DESCRIPTION OF THE DRAWING

The drawing, which is not necessarily drawn to scale, includes the following Figures:

FIG. 3 shows a diagram of the dispensing system shown in FIG. 1.

FIG. 4 includes FIGS. 4A and 4B; FIG. 4A shows a diagram illustrating the basic principle of operation of a Venturi Device; and FIG. 4B shows, by way of example, a Venturi device for using as part of a multiple inlet tube dispensing system according to some embodiments of the present invention.

DETAILED DESCRIPTION OF THE INVENTION

Figure 1:
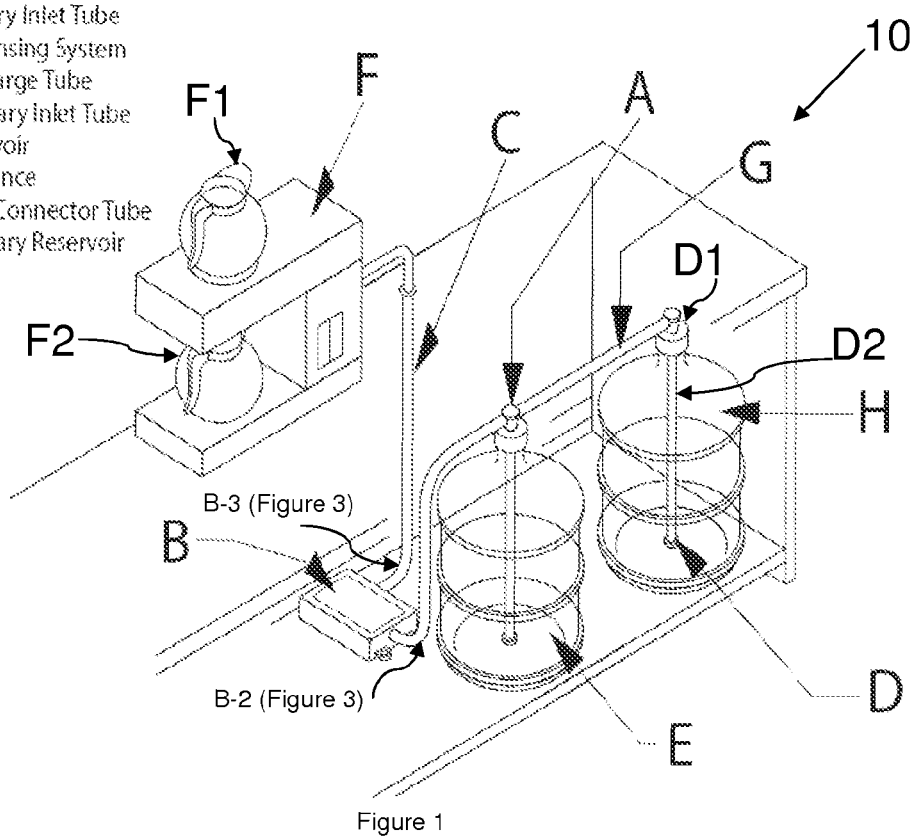
FIG. 1 is a diagram of a system according to some embodiments of the present invention.
Figure 2:
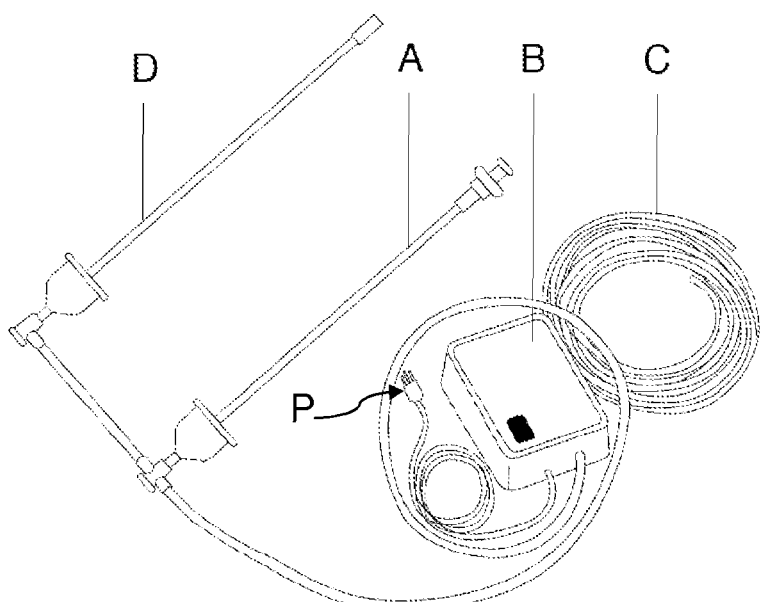
FIG. 2 is a diagram of the basic parts of the invention that form part of the system in FIG. 1.

FIGS. 1 and 2 show a new and unique system generally indicated as 10 according to the present invention that includes a primary inlet tube generally indicated as (A), a dispenser or dispensing system generally indicated as (B), a discharge tube generally indicated as (C), an auxiliary inlet tube generally indicated as (D), a reservoir generally indicated as (E), an appliance generally indicated as (F), a feed connector tube generally indicated as (G) and an auxiliary reservoir generally indicated as (H).

By way of example, the system 10 operates as follows:

As the dispenser or dispensing system (B) is turned on or activated, it will start drawing vacuum through the primary inlet tube (A), and also draw a proportional amount of vacuum from the auxiliary inlet tube(s) (D), which are connected through the feed connector tube (G), as long as the discharge tube (C) is unrestricted.

The discharge tube (C) is coupled between an output for the dispensing system (B) via outlet/discharge tube/port B-3 (FIG. 3) and an input to an appliance (F), which is shown by way of example as a coffee machine with one or more coffee pots f1, f2. The scope of the invention is not intended to be limited to the type or kind of appliance or equipment that receives the fluid being dispensed from the dispensing system (B). The dispenser (B) also has inlet/suction tubing B-2 (see also FIG. 3) coupled to an output port (O) (see FIG. 4B) of the primary inlet tubing (A) for receiving a primary feed of fluid, as well as a plug (P) for coupling to a power source.

By way of example, the present invention is shown and described using one auxiliary inlet tube (D), although the scope of the invention is not intended to be limited to any particular number of auxiliary inlet tubes (D). For example, embodiments are envisioned in which multiple auxiliary tubes and associated auxiliary reservoirs are daisy chained together and coupled to the primary inlet tube (A). However, as a person skilled in the art would appreciate, the number of auxiliary inlet tubes (D) may typically limited to the amount of vacuum generated by the dispensing system (B).

As shown in FIGS. 1 and 2, the auxiliary inlet tube (D) is connected to the primary inlet tube (A) via the feed connector tube (G) such that it provides a proportional vacuum and siphoning effect. The siphoning effect is the vacuum created by the primary tube (A) drawing fluid up the auxiliary tube (D). Soon after the primary inlet tube (A) has evacuated air, the Venturi device (see also FIGS. 4A and 4B) starts drawing fluid from the auxiliary reservoir (H) through the feed connector tube (G). As the fluid level in the main reservoir (E) drops, the siphon draws fluid from the auxiliary reservoir (H) through the Venturi effect, which is illustrated in more detail in FIGS. 4A and 4B.

By way of example, in the system 10 shown and described herein, both the primary and auxiliary reservoirs (E) and (H) are open to atmospheric pressure, and there is no container vacuum required to create the siphoning effect. However, it is important to note that the scope of the invention is not intended to be limited to only open atmospheric type pressure systems, because embodiments are envisioned within the spirit of the invention so as to include other types or kinds of atmospheric type pressure systems either now known or later developed in the future.

As a pump (B-1, see FIG. 3) in the dispensing system (B) initially starts, it evacuates the air trapped in the primary inlet tube (A) first, and draws on the fluid in the primary reservoir (E). By way of example, the pump (B-1) may take the form of a diaphragm positive displacement pump for drawing fluid from the primary reservoir (E), although embodiments are envisioned using other types or kind of pumps either now known or later developed in the future.

As the fluid is removed from the primary inlet tube (A), it pulls or draws the air from the feed connector tube (G) under the Venturi effect, consistent with that illustrated in FIGS. 4A and 4B. By way of example, the primary inlet tube (A) may include a Venturi device (V) like that shown in FIG. 4B having an inlet port (I) and the outlet port (O) for respectively receiving an auxiliary feed and providing the primary feed, as well as tubing (T) for inserting into the primary reservoir (E).

As the fluid in the primary reservoir (E) depletes, the vacuum created in the auxiliary inlet tube (D) provides siphon from the auxiliary reservoir (H) via the feed connector tube (G). By way of example, the auxiliary inlet tube (D) may include a corresponding device d1 having an outlet port for providing the auxiliary feed to the primary inlet tube (A) via the feed connector tube (G), as well as tubing d2 for inserting into the auxiliary reservoir (H). In an embodiment using multiple auxiliary reservoirs that are daisy chained together, one or more of the auxiliary inlet tubes may include an associate Venturi device like Venturi device (V) in FIG. 4B having associated inlet and outlet ports for respectively receiving an associated auxiliary feed from another auxiliary reservoir and providing an associate primary feed, as well as associated tubing for inserting into its associated auxiliary reservoir. These one or more auxiliary inlet tubes may be referred to as intermediate auxiliary inlet tubes arranged between the primary inlet tube and an associated end auxiliary tube, like the auxiliary inlet tube (D). In such embodiments, the end auxiliary inlet tube would typically take the form of like the auxiliary inlet tube (D) consistent with that described herein.

Because of the siphon, the primary reservoir (E) and auxiliary reservoir (H) will deplete at relatively equal amounts depending on the diameters of $d_1$ (e.g. 0.225" as shown in FIG. 4B) of the inlet port (I) or the outlet port (O), or the diameter $d_2$ (e.g. 0.685" as shown in FIG. 4B) of the tubing (T). The diameters are shown by way of example, and the scope of the invention is not intended to be limited to any particular diameter or dimensional relationship between such diameters $d_1$ and/or $d_2$. For example, embodiments are envisioned using other diameters for $d_1$ or $d_2$ having the same or possibly a different dimensional relationship between these diameters $d_1$ and/or $d_2$.

The Venturi Effect

FIG. 4A shows a diagram illustrating the basic principle of operation of a Venturi device. As a person skilled in the art would appreciate, the Venturi effect is the fluid pressure that results when an incompressible fluid flows through a constricted section of pipe. The Venturi effect may be derived from a combination of Bernoulli's principle and the equation of continuity. The fluid velocity must increase through the constriction to satisfy the equation of continuity, while its pressure must decrease due to conservation of energy: the gain in kinetic energy is supplied by a drop in pressure or a pressure gradient force. The limiting case of the Venturi effect is choked flow, in which a constriction in a pipe or channel limits the total flow rate through the channel, because the pressure cannot drop below zero in the constriction. Choked flow is used to control the delivery rate of water and other fluids through spigots and other valves. Referring to the diagram in FIG. 4a, using Bernoulli's equation in the special case of incompressible fluids (such as the approximation of a water jet), the theoretical pressure drop ($P_1$–$P_2$) at the constriction would be given by $$\frac{\rho}{2}(v_2^2 - v_1^2).$$

FIG. 4B shows, by way of example, a Venturi device for using as part of a primary inlet tube (A) that forms part of a multiple inlet tube dispensing system according to some embodiments of the present invention, having two ports, one output port (O) for providing a primary feed, e.g. to the dispensing system (B), and another input port (I) for receiving an auxiliary feed from the auxiliary inlet tubing (D), consistent with that described above.

Possible Applications

Possible applications of the present invention may include at least the following:

Beverage systems, fluid dispensing systems, water supply systems; any system in which there is a supply system, reservoir and dispensing system, In commercial applications where there is a supply of either water or any other fluid to an appliance, whereas fluid level or presence is detected by any sensing means or mechanism, car wash, ware wash, cisterns, septic tanks, and any other applicable application that requires level sensing, or where relatively low ratio mixing is required.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A system comprising:
a dispenser configured to provide fluid from multiple reservoirs to an appliance or other suitable device; and
a multiple tubing arrangement configured to couple the dispenser and the multiple reservoirs of fluid, the multiple tubing arrangement being responsive to a vacuum provided from the dispenser, for drawing the fluid from the multiple reservoirs so as to deplete the multiple reservoirs at relatively equal amounts based on a Venturi effect, the multiple tubing arrangement comprising a primary inlet tube having a Venturi device arranged therein for creating a suction, the Venturi device having a short tube with a tapering constriction in the middle that causes an increase in velocity of flow of the fluid and a corresponding decrease in fluid pressure.

2. A system according to claim 1, wherein the multiple tubing arrangement comprises some combination of the primary inlet tube configured for arranging in a primary reservoir, an auxiliary inlet tube configured for arranging in an auxiliary reservoir, a feed connector tube configured for arranging between the primary inlet tube and auxiliary inlet tube, an inlet suction tube configured for arranging between the dispenser and the primary inlet tube, or a discharge tube configured for arranging between the dispenser and the appliance.

3. A system according to claim 2, wherein the primary inlet tube is configured to couple to the auxiliary inlet tube so as to provide a proportional vacuum and siphoning effect.

4. A system according to claim 1, wherein the system comprises a discharge tube configured to couple between the dispenser and the appliance.

5. A system according to claim 1, wherein the multiple reservoirs are open to atmospheric pressure.

6. A system according to claim 3, wherein the system does not require container vacuum to create the proportional vacuum and siphoning effect.

7. A system according to claim 1, wherein the number of auxiliary inlet tubes and reservoirs depends on the amount of vacuum generated by the dispenser.

8. A system according to claim 1, wherein the multiple tubing arrangement is configured to siphon and deplete the fluid from the primary reservoir and the auxiliary reservoir based on the Venturi effect.

9. A system according to claim 1, wherein the dispenser comprises a diaphragm positive displacement pump that draws fluid from a primary reservoir.

10. A system according to claim 1, wherein the multiple tubing arrangement comprises:
the primary inlet tube configured for arranging in a primary reservoir;
an auxiliary inlet tube configured for arranging in an auxiliary reservoir;

a feed connector tube configured for arranging between the primary inlet tube and the auxiliary inlet tube;

an inlet suction tube configured for arranging between the dispenser and the primary inlet tube; and a discharge tube configured for arranging between the dispenser and the appliance.

11. A method comprising:

coupling a multiple tubing arrangement between a dispenser and multiple reservoirs of fluid;

arranging a primary inlet tube having a Venturi device in a reservoir for creating a suction therein, the Venturi device having a short tube with a tapering constriction in the middle that causes an increase in velocity of flow of the fluid and a corresponding decrease in fluid pressure; and activating the dispenser for generating a vacuum in the multiple tube arrangement so as to draw the fluid from the multiple reservoirs, deplete the multiple reservoirs at relatively equal amounts based on a Venturi effect, and provide the fluid from the dispenser for provisioning to an appliance.

12. A method according to claim 11, wherein the coupling comprises some combination of arranging the primary inlet tube that forms part of the multiple tubing arrangement in a primary reservoir, arranging an auxiliary inlet tube that forms part of the multiple tubing arrangement in an auxiliary reservoir, arranging a feed connector tube that forms part of the multiple tubing arrangement between the primary inlet tube and auxiliary inlet tube, arranging an inlet suction tube that forms part of the multiple tubing arrangement between the dispenser and the primary inlet tube, or arranging a discharge tube between the dispenser and the appliance.

13. A method according to claim 12, wherein the coupling further comprises coupling the primary inlet tube to the auxiliary inlet tube so as to provide a proportional vacuum and siphoning effect.

14. A method according to claim 11, wherein the coupling comprises coupling a discharge tube between the dispenser and the appliance.

15. A method according to claim 11, wherein the method comprises opening the multiple reservoirs to atmospheric pressure.

16. A method according to claim 13, wherein the method comprises coupling a discharge hose between the dispenser and the appliance so as to provide the fluid to the appliance.

17. A method according to claim 11, wherein the method comprises siphoning and depleting with the multiple tubing arrangement the fluid from the primary reservoir and the auxiliary reservoir based on the Venturi effect.

18. A method according to claim 11, wherein the coupling comprises:

arranging the primary inlet tube that forms part of the multiple tubing arrangement in a primary reservoir;

arranging an auxiliary inlet tube that forms part of the multiple tubing arrangement in an auxiliary reservoir;

arranging a feed connector tube that forms part of the multiple tubing arrangement between the primary inlet tube and auxiliary inlet tube;

arranging an inlet suction tube that forms part of the multiple tubing arrangement between the dispenser and the primary inlet tube; and arranging a discharge tube between the dispenser and the appliance.

19. A kit comprising:

a dispenser for providing fluid from multiple reservoirs to an appliance or other suitable device; and a multiple tubing arrangement configured for coupling the dispenser and the multiple reservoirs of fluid, the multiple tubing arrangement also being configured for responding to a vacuum provided from the dispenser and for drawing the fluid from the multiple reservoirs so as to deplete the multiple reservoirs at relatively equal amounts based on the Venturi effect, the multiple tubing arrangement comprising a primary inlet tube having a Venturi device arranged therein for creating a suction, the Venturi device having a short tube with a tapering constriction in the middle that causes an increase in velocity of flow of the fluid and a corresponding decrease in fluid pressure.

20. A kit according to claim 19, wherein the multiple tubing arrangement comprises some combination of the primary inlet tube configured for arranging in a primary reservoir, an auxiliary inlet tube configured for arranging in an auxiliary reservoir, a feed connector tube configured for arranging between the primary inlet tube and auxiliary inlet tube, an inlet suction tube configured for arranging between the dispenser and the primary inlet tube, or a discharge tube configured for arranging between the dispenser and the appliance.

21. A kit according to claim 19, wherein the multiple tubing arrangement comprises:

the primary inlet tube configured for arranging in a primary reservoir;

an auxiliary inlet tube configured for arranging in an auxiliary reservoir;

a feed connector tube configured for arranging between the primary inlet tube and auxiliary inlet tube;

an inlet suction tube configured for arranging between the dispenser and the primary inlet tube; and a discharge tube configured for arranging between the dispenser and the appliance.

* * * * *